US012613544B2

(12) United States Patent
Yeo et al.

(10) Patent No.: US 12,613,544 B2
(45) Date of Patent: Apr. 28, 2026

(54) LOW DROPOUT REGULATORS

(71) Applicant: LX SEMICON CO., LTD., Daejeon (KR)

(72) Inventors: Sung Dae Yeo, Daejeon (KR); Tae Jun Ahn, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 156 days.

(21) Appl. No.: 18/488,814

(22) Filed: Oct. 17, 2023

(65) Prior Publication Data

US 2024/0126317 A1 Apr. 18, 2024

(30) Foreign Application Priority Data

Oct. 18, 2022 (KR) ........................ 10-2022-0133723

(51) Int. Cl.
*G05F 1/575* (2006.01)
*G05F 1/569* (2006.01)

(52) U.S. Cl.
CPC .................................... *G05F 1/575* (2013.01)

(58) Field of Classification Search
CPC ........... G05F 1/575; G05F 1/569; G05F 1/561
See application file for complete search history.

(56) References Cited

U.S. PATENT DOCUMENTS 7,737,674 B2 * 6/2010 Erbito, Jr. ................. G05F 1/56 323/313
10,146,240 B1 * 12/2018 Wang ...................... G05F 3/242
10,498,333 B1 * 12/2019 Ankamreddi ........... G05F 1/565
2005/0189934 A1 9/2005 Poss
2008/0278199 A1 * 11/2008 Chen .............. H03K 19/018507 326/83
2017/0083034 A1 3/2017 Yang et al.
2017/0269620 A1 * 9/2017 Duong .................... G05F 1/575
2023/0122458 A1 * 4/2023 Zhang ..................... G05F 3/262 323/280
2025/0172960 A1 * 5/2025 Chen ....................... G05F 1/575

OTHER PUBLICATIONS

Extended European Search Report issued for EP Application No. 23203431.4, issued on Mar. 7, 2024, 8 pages.

* cited by examiner

*Primary Examiner* — Sisay G Tiku
(74) *Attorney, Agent, or Firm* — ROTHWELL, FIGG, ERNST & MANBECK, P.C.

(57) ABSTRACT

A low dropout regulator can comprise a driver configured to receive a first input voltage and generates an output voltage, an error amplifier configured to receive a second input voltage having a magnitude different from the first input voltage and output an amplifier output voltage based on the difference between a feedback voltage corresponding to the output voltage and a reference voltage, and a driving controller configured to control the output voltage of the driver based on the amplifier output voltage.

17 Claims, 8 Drawing Sheets

LOW DROPOUT REGULATORS

CROSS-REFERENCE TO RELATED APPLICATIONS

The present application claims the benefits of priority to Korean Patent Application No. 10-2022-0133723, filed on Oct. 18, 2022, which is incorporated herein by reference in its entirety.

TECHNICAL FIELD

The embodiment relates to a low dropout regulator that receives an input voltage and produces an output voltage of a constant magnitude.

BACKGROUND

A DC/DC converter that converts a voltage of direct current (DC) power comprises a boost converter, a buck converter, etc. The boost converter outputs an output voltage that boosts the input voltage. The boost converter is also referred to as a step-up converter. The buck converter outputs an output voltage that lowers the input voltage. The buck converter is also referred to as a step-down converter.

For the DC/DC converter, a linear regulator and a switching regulator are used depending on the conversion scheme. Among these, the linear regulator is relatively simple to design and low cost, but can only step down when the input voltage is greater than the output voltage. An example of the linear regulator is a low dropout (LDO) regulator (hereinafter referred to as an 'LDO regulator'). The LDO regulator can provide a power source with good power efficiency because it outputs a stabilized output voltage even if the difference between the input voltage and the output voltage is relatively small.

For example, the LDO regulator comprises a driver (e.g., driver transistor) that generates an output voltage by dropping the input voltage. The LDO regulator can maintain the output voltage stably by feeding back the output voltage output from the driving transistor and controlling a gate terminal of the driving transistor according to the magnitude of the fed back output voltage. For this purpose, the LDO regulator comprises an error amplifier that compares the output voltage and the reference voltage and amplifies the difference therebetween.

Meanwhile, the input voltage (or input power) for operating the error amplifier can be received from the outside of the LDO regulator and shared with the input voltage (or input power) input to the driving transistor. In the case of an LDO regulator with a relatively large load, the lower the input voltage of the driving transistor, the more advantageous it is to save power. However, if the input voltage of the driving transistor is excessively lowered, a problem can occur in which the error amplifier used by sharing the input voltage may not operate normally. Therefore, there is a need to develop technology that can use a relatively low input voltage in an LDO regulator with a relatively large load.

SUMMARY

Against this background, one object of the embodiment is to provide a low dropout regulator capable of using relatively low input voltage by supplying different an input voltage supplied to the driving transistor which generates the output voltage and an input voltage supplied to error amplifier.

Another object of the embodiment is to provide a low dropout regulator capable of reducing unnecessary current consumption without using a pull-up element by supplying different an input voltage supplied to the driving transistor which generates the output voltage and an input voltage supplied to error amplifier, but by connecting a PMOS transistor between the gate terminal and the input line that supplies the input voltage to the driving transistor.

To achieve the above-mentioned purpose, according to an embodiment, a low dropout regulator, comprising: a driver configured to receive a first input voltage and generates an output voltage; an error amplifier configured to receive a second input voltage having a magnitude different from the first input voltage and output an amplifier output voltage based on the difference between a feedback voltage corresponding to the output voltage and a reference voltage; and a driving controller configured to control the output voltage of the driver based on the amplifier output voltage.

According to another embodiment, a low dropout regulator, comprising: a driver configured to receive a first input voltage and generate an output voltage; an error amplifier configured to receive a second input voltage having a magnitude different from the first input voltage and output an amplifier output voltage based on the difference between a feedback voltage corresponding to the output voltage and a reference voltage; and a driving controller configured to control the output voltage of the driver based on the amplifier output voltage, wherein the driving controller comprises: a switching circuit connected between an output line of the error amplifier and a gate terminal of the driving transistor; a first PMOS transistor comprising one terminal connected to a supply line that supplies the first input voltage; and a second PMOS transistor comprising one terminal connected to the other terminal of the first PMOS transistor and the other terminal connected between the switching circuit and the gate terminal of the driving transistor.

According to another embodiment, a low dropout regulator, comprising: a driver configured to receive a first input voltage and generate an output voltage; an error amplifier configured to receive a second input voltage having a magnitude different from the first input voltage and output an amplifier output voltage based on the difference between a feedback voltage corresponding to the output voltage and a reference voltage; a first PMOS transistor comprising one terminal connected to a supply line that supplies the first input voltage; and a second PMOS transistor comprising one terminal connected to the other terminal of the first PMOS transistor and the other terminal connected to a gate terminal of a driving transistor included in the driver.

As described above, according to the embodiment, the input voltage supplied from the LDO regulator to the driving transistor and the input voltage supplied to the error amplifier are supplied differently, so that a relatively low input voltage can be used in the LOD regulator with a relatively large load.

In addition, according to the embodiment, the input voltage supplied to the driving transistor from the LDO regulator and the input voltage supplied to the error amplifier are differently supplied, but a PMOS transistor is connected between the input line and gate terminal of the driving transistor, so that unnecessary current consumption can be reduced by using a pull-up element. Also, since a pull-up element is not used, the area required for using a resistor can be reduced. In addition, when the LDO regulator is not operating, the voltage within the switch connected to the driving transistor can be set to 0V, thereby ensuring stability of operation.

DETAILED DESCRIPTION

Figure 1:
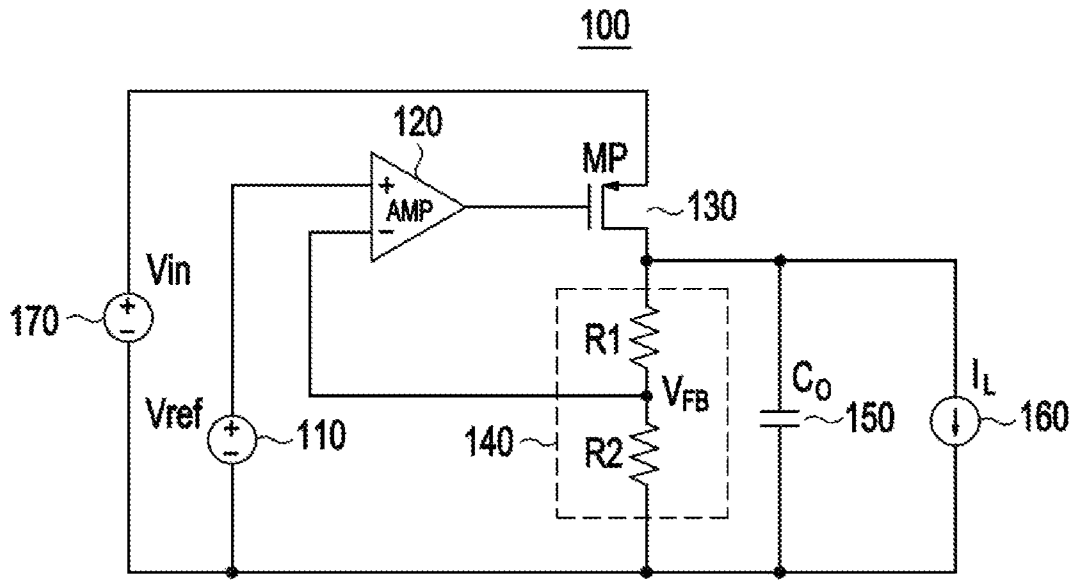
FIG. 1 is an example circuit diagram of a low-dropout regulator according to an embodiment.

Hereinafter, some embodiments of the present invention will be described in detail through illustrative drawings. When adding reference numerals to components in each drawing, it should be noted that same components are given the same reference numerals as much as possible even if they are shown in different drawings. Additionally, in describing the present invention, if it is determined that a detailed description of a related known configuration or function can obscure the gist of the present invention, the detailed description will be omitted.

Additionally, when describing the components of the present invention, terms such as first, second, A, B, (a), (b), etc. can be used. These terms are only used to distinguish the component from other components, and the nature, sequence, or order of the component is not limited by the term. When a component is described as being "connected" or "coupled" to another component, the component can be directly connected or coupled to the other component, but it should be understood that another component can be "connected" or "coupled" between each component.

FIG. 1 is an example circuit diagram of a low-dropout regulator according to an embodiment.

Referring to FIG. 1, the LDO regulator 100 can comprise an error amplifier 120, a driving transistor 130, an output voltage divider 140, and an output capacitor 150. The driving transistor 130 can also be called a pass transistor. The pass transistor can mean a transistor used as a switch to transfer logic levels between nodes in a circuit instead of a switch directly connected to a line of the supply voltage, but is not limited thereto.

According to the embodiment, the LDO regulator 100 can generate an output voltage by reducing an input voltage 170 input to the driving transistor 130. In order to adjust the magnitude of the load current 160, The LDO regulator 100 can feed back a voltage (referred to as feedback voltage VFB) between an output voltage divided by the output voltage divider 140 and a bandgap reference voltage 110 to an inverting input terminal of the error amplifier 120. The error amplifier 120 can receive a feedback voltage VFB through the inverting input terminal and a reference voltage 110 through a non-inverting input terminal, and output an amplified result by the difference, that is, an output voltage. The output voltage of the error amplifier 120 can be input to a gate terminal of the driving transistor 130. By adjusting a gate voltage of the driving transistor 130 according to the output voltage of the error amplifier 120, the output voltage can be adjusted to be constant. The output voltage divider 140 can comprise, for example, a first resistor R1 and a second resistor R2 connected in series, but is not limited thereto.

According to an embodiment, in order to supply a high load current 160 in a situation where the dropout voltage is low, the driving transistor 130 can be relatively large. That is, the driving transistor 130 with a very large input capacitance can be used. The output resistance of the error amplifier 120 can also be very large. Accordingly, a pole located at an output terminal of the error amplifier 120 can be located in a low frequency band. If both the main pole formed by the output capacitor 150 and the negative pole located at the output terminal of the error amplifier 120 can be located in a frequency band lower than the unity gain frequency of the loop formed in the LDO regulator 100, loop stability cannot be guaranteed. Considering this, a method of improving the stability of the LDO regulator 100 can be used by adding a buffer (e.g., a source follower buffer) between the output terminal of the error amplifier 120 and the input terminal of the driving transistor 130. If both the input capacitance and output resistance of the buffer are sufficiently small, the negative poles present at the input and output terminals of the buffer, excluding the main pole located at the output terminal of the LDO regulator 100, can be effectively located in a band higher than the unity gain frequency.

In the embodiments of the LDO regulator 100 described later, a circuit in which a buffer is added between the output terminal of the error amplifier 120 and the input terminal of the driving transistor 130 is described as an example, but the embodiments described later are not limited thereto.

Figure 2:
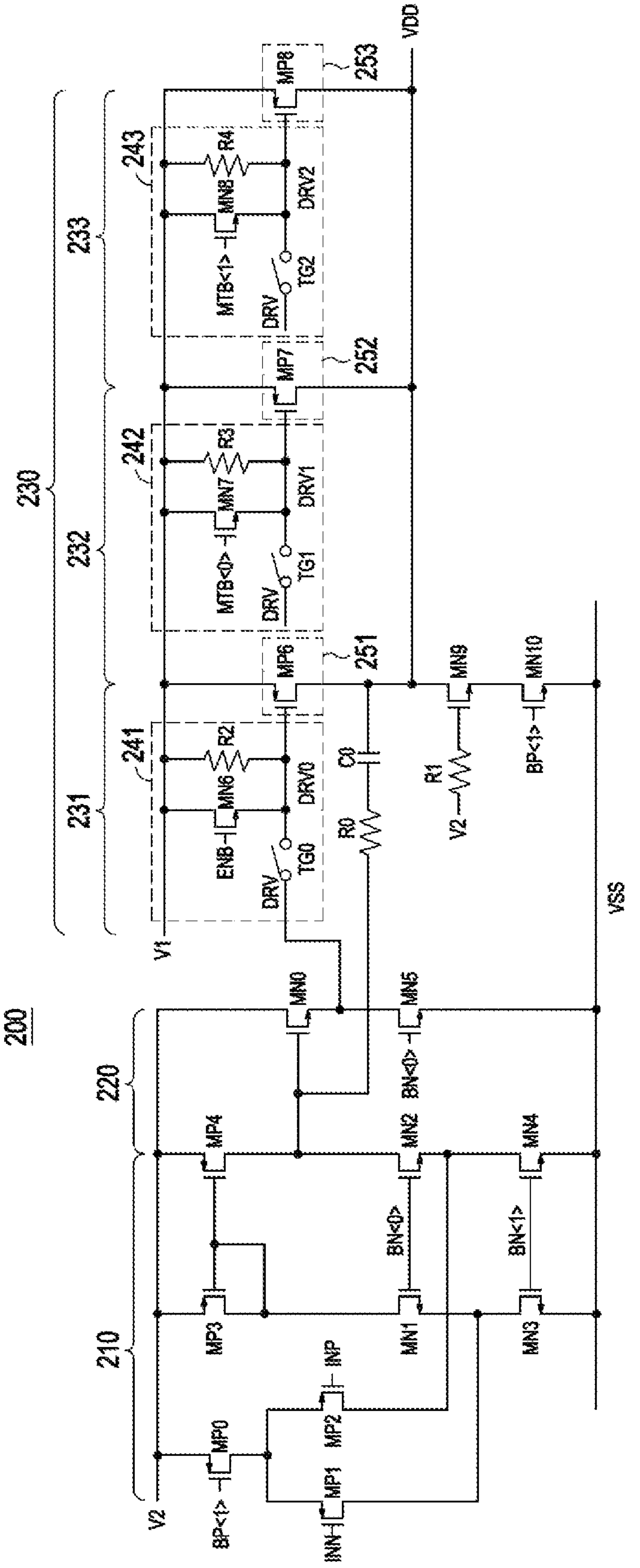
FIG. 2 is another example of a circuit diagram of a low dropout regulator according to an embodiment.

FIG. 2 is another example of a circuit diagram of a low dropout regulator according to an embodiment.

Referring to FIG. 2, the LDO regulator 200 can comprise an error amplifier 210, a buffer 220 (e.g., a source follower buffer), an output circuit 230, etc.

According to the embodiment, the output circuit 230 can comprise a first output circuit 231, a second output circuit 232, and a third output circuit 233. According to various embodiments, the output circuit 230 can be comprised of only the first output circuit 231, or can be comprised of two or more output circuits (e.g., three) as shown in FIG. 2.

When configured to comprise three output circuits as shown in FIG. 2, at least one output circuit can selectively operate according to a control signal. For example, only the first output circuit 231 can be operated, the first output circuit 231 and the second output circuit 232 can be operated together, or the first output circuit 231, the second output circuit 232 and the third output circuit 233 can be operated together. In the embodiments described later, the three output circuits 231 to 233 included in the output circuit 230 are described as operating selectively, but are not limited thereto.

According to an embodiment, each of the output circuits, for example, the first output circuit 231, the second output circuit 232, and the third output circuit 233, can comprise a driving controller and a driver. For example, the first output circuit 231 can comprise a first driving controller 241 and a first driver 251. The second output circuit 232 can comprise a second driving controller 242 and a second driver 252. The third output circuit 233 can comprise a third driving controller 243 and a third driver 253.

According to an embodiment, each of the drivers 251 to 253 can comprise PMOS transistors MP6, MP7 and MP8 as driving transistors. Each of the driving controllers 241 to 243 can be connected to the gate terminal of the PMOS transistor MP6, MP7 and MP8 included in the corresponding driver 251 to 253 to control an output voltage of each of the drivers 251 to 253. For example, the first driving controller 241 can adjust the output voltage of the first driver 251 by controlling the voltage input to the gate terminal of the sixth PMOS transistor MP6 included in the first driver 251. The second driving controller 242 can adjust the output voltage of the second driver 252 by controlling the voltage input to the gate terminal of the seventh PMOS transistor MP7 included in the second driver 252. The third driving controller 243 can adjust the output voltage of the third driver 253 by controlling the voltage input to the gate terminal of the eighth PMOS transistor MP8 included in the third driver 253.

According to an embodiment, each of the driving controllers 241 to 243 can comprise a switching circuit, an NMOS transistor, and a resistor. The switching circuits TG0, TG1 and TG2 can be connected between a node of the error amplifier 210 or buffer 220 and the gate terminals of the PMOS transistors MP6, MP7 and MP8 included in the drivers 251 to 253. By controlling the switching circuit to be short-circuited or open, the output voltage of the error amplifier 210 or buffer 220 can be controlled to be input to or blocked from the gate terminal of the PMOS transistors MP6, MP7 and MP8. Examples of the switching circuits TG0, TG1 and TG2 will be described later in the description of FIGS. 3A, 3B, and 3C.

According to an embodiment, the first driving controller 241 can comprise a first switch TG0, a sixth NMOS transistor MN6, and a second resistor R2. As shown in FIG. 2, the first switch TG0 can comprise one terminal connected between the zeroth NMOS transistor MN0 and the fifth NMOS transistor MN5 included in the buffer 220, and the other terminal connected to the gate terminal of the sixth PMOS transistor MP6 included in the first driver 251. The sixth NMOS transistor MN6 can comprise one terminal connected to a supply line that supplies the first input voltage V1, and the other terminal connected between the first switch TG0 and a gate terminal of the sixth PMOS transistor MP6. The second resistor R2 can be connected in parallel with the sixth NMOS transistor NM6.

According to an embodiment, the second driving controller 242 can comprise a second switch TG1, a seventh NMOS transistor MN7, and a third resistor R3. As shown, the second switch TG1 can comprise one terminal connected between the zeroth NMOS transistor MN0 and the fifth NMOS transistor MN5 included in the buffer 220, and the other terminal connected to the gate terminal of the seventh PMOS transistor MP7 included in the second driver 252. The seventh NMOS transistor MN7 can comprise one terminal connected to a supply line that supplies the first input voltage V1, and the other terminal connected to the second switch TG1 and a gate terminal of the seventh PMOS transistor MP7. The third resistor R3 can be connected in parallel with the seventh NMOS transistor NM7.

According to an embodiment, the third driving controller 243 can comprise a third switch TG2, an eighth NMOS transistor MN8, and a fourth resistor R4. As shown, the third switch TG2 can comprise one terminal connected between the zeroth NMOS transistor MN0 and the fifth NMOS transistor MN5 included in the buffer 220, and the other terminal connected to the gate terminal of the eighth PMOS transistor MP8 included in the third driver 253. The eighth NMOS transistor MN8 can comprise one terminal connected to a supply line that supplies the first input voltage V1, and the other terminal connected between the third switch TG2 and the gate terminal of the eighth PMOS transistor MP8. The fourth resistor R4 can be connected in parallel with the eighth NMOS transistor NMB.

According to an embodiment, the sixth PMOS transistor MP6 included in the first driver 251 can comprise a source terminal connected to a supply line that supplies the first input voltage V1, and a drain terminal connected to an output line that outputs the output voltage VDD to the load. The seventh PMOS transistor MP7 included in the second driver 252 can comprise a source terminal connected to a supply line that supplies the first input voltage V1, and a drain terminal connected to an output line that outputs the output voltage VDD to the load. The eighth PMOS transistor MP8 included in the third driver 253 can comprise a source terminal connected to a supply line that supplies the first input voltage V1, and a drain terminal connected to an output line that outputs the output voltage VDD to the load.

According to an embodiment, the LDO regulator 200 can receive the first input voltage V1 input to each of the drivers 251 to 253 of the output circuit 230 and reduce the first input voltage V1 to generate the output voltage VDD. The first input voltage V1 input to each of the drivers 251 to 253 can be supply power or a supply voltage supplied from outside the LDO regulator 200. For example, the first input voltage V1 can be supplied from a power management integrated circuit (PMIC), but is not limited thereto.

According to an embodiment, the LDO regulator 200 can feed back an output voltage divided by the output voltage divider (not shown) to the error amplifier 210 in order to adjust the magnitude of the load current flowing in the load to which the output voltage VDD is supplied. The output voltage fed back to the error amplifier 210 can be referred to as a feedback voltage VFB.

According to an embodiment, the error amplifier 210 can receive the feedback voltage VFB and the reference voltage Vref and output a result amplified by the difference to the buffer 220 or the output circuit 230. The output voltage of the error amplifier 210 can be input to the gate terminal of the PMOS transistors MP6, MP7 and MP8 included in each driver 251 to 253 through each switch TG0, TG1 and TG2. The gate voltage of each PMOS transistor MP6, MP7 and MP8 can be adjusted according to the output voltage of the error amplifier 210, so that the output voltage VDD can be adjusted to be constant.

According to an embodiment, the error amplifier 210 can use a second input voltage V2 as a driving power source or driving voltage. The second input voltage V2 can be an input voltage of a different magnitude from a first input voltage V1 which is an input voltage of the output circuit 230. The second input voltage V2 input to the error amplifier 210 can be a supply power or a supply voltage supplied from outside the LDO regulator 200. For example, the second input voltage V2 can be supplied from a power management integrated circuit (PMIC), but is not limited thereto. According to an embodiment, the magnitude of the first input voltage V1 can be smaller than the magnitude of the second input voltage V2. For example, the input voltage (e.g., the first input voltage V1) and the input voltage (e.g., the second input voltage V2) can be supplied differently, so a relatively low input voltage (e.g., first input voltage V1) can be used in the LOD regulator 200 with a relatively large load. The first input voltage V1 can be supplied from the LDO regulator 200 to each driver 251 to 253 (e.g., PMOS transistors MP6, MP7, and MP8) of the output circuit 230, and the second input voltage V2 can be supplied to the error amplifier 210. For example, the input voltage (e.g., the second input voltage V2) supplied to the error amplifier 210 can be supplied at a relatively high voltage to enable the plurality of MOS transistors included in the error amplifier 210 to operate. The input voltage (e.g., first input voltage V1) supplied to the output circuit 230 can be relatively lower than the second input voltage V2 supplied to the error amplifier 210, so that power can be saved in the LDO regulator 200, which has a relatively large load. The error amplifier 210 can be configured in a cascode form as shown in FIG. 2, but is not limited thereto.

According to an embodiment, the error amplifier 210 can comprise a plurality of PMOS transistors (e.g., a zeroth PMOS transistor MP0, a first PMOS transistor MP1, a second PMOS transistor MP2, and a third PMOS transistor MP3, a fourth PMOS transistor MP4) and a plurality of NMOS transistors (e.g., a first NMOS transistor MN1, a second NMOS transistor MN2, a third NMOS transistor MN3, and a fourth NMOS transistor MN4). The zeroth PMOS transistor MP0 can comprise one terminal (e.g., source terminal) in which the second input voltage V2 is supplied, and a gate terminal in which a constant bias voltage BP<1> is supplied. The feedback voltage INN fed back from the voltage corresponding to the output voltage VDD of the output circuit 230 (e.g., a voltage divided by a set ratio from the output voltage by series-connected voltage dividing resistors (e.g., R1 and R2 of FIG. 1)) can be supplied to the gate terminal of the first PMOS transistor MP1. The other terminal of the first PMOS transistor MP1 can be connected between the first NMOS transistor MN1 and the third NMOS transistor MN3. The second PMOS transistor MP2 can be differentially coupled to the first PMOS transistor MP1, and a reference voltage INP (e.g., a bandgap reference voltage Vref) can be input to the gate terminal. The other terminal of the second PMOS transistor MP2 can be connected between the second NMOS transistor MN2 and the fourth NMOS transistor MN4. According to an embodiment, the first PMOS transistor MP1 can be differentially coupled to the second PMOS transistor MP2, and the amplifier output voltage (for example, the error voltage Verror based on the difference between the feedback voltage INN and the reference voltage INP fed back from the output circuit 230 can be differentially amplified.

According to an embodiment, the gate terminals of the third PMOS transistor MP3 and the fourth PMOS transistor MP4 can be commonly connected to each other. The second input voltage V2 can be supplied to one terminal (e.g., source terminal) of the third PMOS transistor MP3, and the other terminal (e.g., drain terminal) can be connected to one terminal (e.g., drain terminal) of the first NMOS transistor MN1. The gate terminal and drain terminal of the third PMOS transistor MP3 can be connected in a diode connected form. The second input voltage V2 can be supplied to one terminal (e.g., source terminal) of the fourth PMOS transistor MP4, and the other terminal (e.g., drain terminal) can be supplied to one terminal (e.g., drain terminal) of the second NMOS transistor MN2.

According to an embodiment, the gate terminals of the first NMOS transistor MN1 and the second NMOS transistor MN2 can be commonly connected to each other. A bias voltage (BN<0>) can be commonly supplied to the commonly connected gate terminal. The first NMOS transistor MN1 can comprise one terminal (e.g., drain terminal) connected to the other terminal (e.g., drain terminal) of the third PMOS transistor MP3, and the other terminal (e.g., source terminal) connected to one terminal (e.g., drain terminal) of the third NMOS transistor MN3. The second NMOS transistor MN2 can comprise one terminal (e.g., drain terminal) connected to the other terminal (e.g., drain terminal) of the fourth PMOS transistor MP4, and the other terminal (e.g., source terminal) connected to one terminal (e.g., drain terminal) of the fourth PMOS transistor MP4.

According to an embodiment, the gate terminals of the third NMOS transistor MN3 and the fourth NMOS transistor MN4 can be commonly connected to each other. A bias voltage (BN<1>) can be commonly supplied to the commonly connected gate terminal. The third NMOS transistor MN3 can comprise one terminal (e.g., drain terminal) connected to the other terminal (e.g., source terminal) of the first NMOS transistor MN1, and the other terminal (e.g., source terminal) connected to a line of a base voltage VSS or ground GND. The fourth NMOS transistor MN4 can comprise one terminal (e.g., drain terminal) connected to the other terminal (e.g., source terminal) of the second NMOS transistor MN2, and the other terminal (e.g., source terminal) connected to a line of a base voltage VSS or ground GND.

According to an embodiment, the zeroth NMOS transistor MN0 and the fifth NMOS transistor MN5 can be connected in series in the buffer 220 (e.g., source follower buffer). For example, the second input voltage V2 can be supplied to one terminal (e.g., drain terminal) of the zeroth NMOS transistor MN0, and the other terminal (e.g., source terminal) of the zeroth NMOS transistor MN0 can be connected to one terminal (e.g., drain terminal) of the fifth NMOS transistor MN5. The fifth NMOS transistor MN5 can comprise one terminal (e.g., drain terminal) connected to the other terminal (e.g., source terminal) of the zeroth NMOS transistor MN0, and the other terminal (e.g., source terminal) connected to the line of the base voltage VSS or ground GND. The node between the zeroth NMOS transistor MN0 and the fifth NMOS transistor MN5 can be connected to each switching circuit (e.g., the first switch TG0, the second switch TG1, and the third switch TG2. Accordingly, a voltage supplied to the node between the zeroth NMOS transistor MN0 and the fifth NMOS transistor MN5 can be supplied to each driver (e.g., the first driver 251, the second driver 252, and the third driver 253) according to the control of each switching circuit. According to an embodiment, a resistor R0 and a capacitor CO can be connected in series between the gate terminal of the zeroth NMOS transistor MN0 and the drain terminal of the sixth PMOS transistor MP6 of the first driver 251. According to various embodiments, the resistor R0 and the capacitor CO can function to improve an AC stability of a signal supplied from the error amplifier 210 or buffer 220 to the output circuit 230.

According to an embodiment, the ninth NMOS transistor MN9 and the tenth NMOS transistor MN10 are connected in series between an output line supplying the output voltage VDD of each of the drivers 251 to 253 and the line of the base voltage VSS. A first resistor R1 can be connected to a gate terminal of the ninth NMOS transistor MN9, and a second input voltage V2 can be input to the first resistor R1. The ninth NMOS transistor MN9 can be operated for an electro static discharge (ESD) protection function. A bias voltage (BP<1>) can be supplied to a gate terminal of the tenth NMOS transistor MN10. When the output voltage VDD exceeds the target output voltage value, the tenth NMOS transistor MN10 can function to discharge current to bring down the corresponding output voltage VDD.

According to an embodiment, in the error amplifier 210, a differentially amplified voltage (e.g., amplifier output voltage or error voltage) with respect to the feedback voltage VFB supplied to the gate terminal of the first PMOS transistor MP1 and the reference voltage Vref supplied to the gate terminal of the second PMOS transistor MP2 can be supplied to the gate terminal of the PMOS transistor MP6, MP7 and MP8 included in each driver 251 to 253 through the buffer 220, and an output voltage VDD can be generated according to the operation of each PMOS transistor MP6, MP7 and MP8.

Hereinafter, with reference to FIGS. 3A, 3B, and 3C, the structure of the switching circuit connected to the gate terminal of each driving transistor (e.g., PMOS transistors MP6, MP7 and MP8 included in the drivers 251 to 253) will be explained.

Figure 3A:
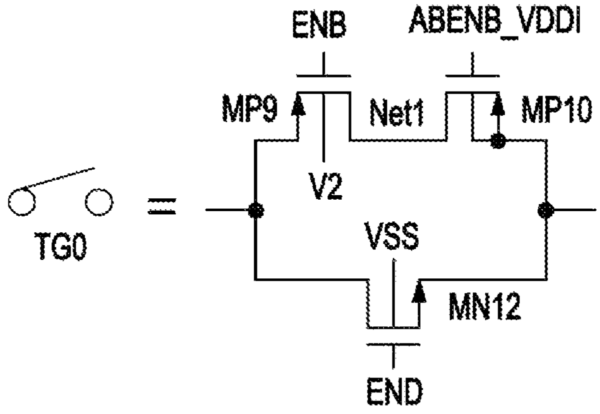
FIG. 3A is an example of a circuit diagram of a switching circuit connected to a gate terminal of a driving transistor according to an embodiment.

FIG. 3A is an example of a circuit diagram of a switching circuit connected to a gate terminal of a driving transistor according to an embodiment.

Referring to FIG. 3A, in the first switch TG0, a ninth PMOS transistor MP9 and a tenth PMOS transistor MP10 can be connected in series. An ENB signal can be input to a gate terminal of the ninth PMOS transistor MP9, and a second input voltage V2 can be input to the bulk. An ABENB_VDDI signal can be input to a gate terminal of the tenth PMOS transistor MP10. According to an embodiment, the first switch TG0 can further comprise a twelfth NMOS transistor MN12 connected in parallel with the series-connected PMOS transistors (e.g., MP9 and MP10). An END signal can be input to a gate terminal of the twelfth NMOS transistor MN12. The ENB signal, the ABENB_VDDI signal, and the END signal input to the gate terminal of each transistor will be described later in the description of FIGS. 4 to 7.

Figure 3B:
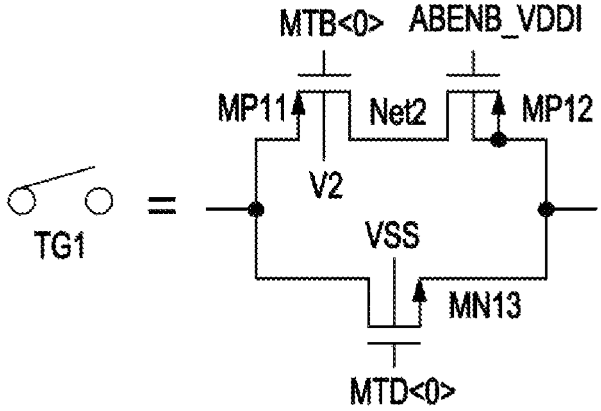
FIG. 3B is another example of a circuit diagram of a switching circuit connected to a gate terminal of a driving transistor according to an embodiment.

FIG. 3B is another example of a circuit diagram of a switching circuit connected to a gate terminal of a driving transistor according to an embodiment.

Referring to FIG. 3B, in the second switch TG1, an eleventh PMOS transistor MP11 and a twelfth PMOS transistor MP12 can be connected in series. A MTB<0> signal can be input to a gate terminal of the eleventh PMOS transistor MP11, and a second input voltage V2 can be input to the bulk. An ABENB_VDDI signal can be input to a gate terminal of the twelfth PMOS transistor MP12. According to an embodiment, the second switch TG1 can further comprise a thirteenth NMOS transistor MN13 connected in parallel with the series-connected PMOS transistors (e.g., MP11 and MP12). A MTD<0> signal can be input to a gate terminal of the thirteenth NMOS transistor MN13. The MTB<0> signal, the ABENB_VDDI signal, and the MTD<0> signal input to the gate terminal of each transistor will be described later in the description of FIGS. 4 to 7.

Figure 3C:
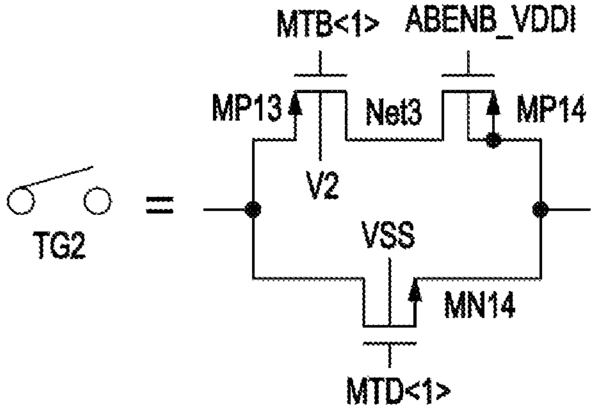
FIG. 3C is another example of a circuit diagram of a switching circuit connected to a gate terminal of a driving transistor according to an embodiment.

FIG. 3C is another example of a circuit diagram of a switching circuit connected to a gate terminal of a driving transistor according to an embodiment.

Referring to FIG. 3C, in the third switch TG2, a thirteenth PMOS transistor MP13 and a fourteenth PMOS transistor MP14 can be connected in series. An MTB<1> signal can be input to a gate terminal of the thirteenth PMOS transistor MP13, and a second input voltage V2 can be input to the bulk. An ABENB_VDDI signal can be input to a gate terminal of the fourteenth PMOS transistor MP14. According to an embodiment, the third switch TG2 can further comprise a fourteenth NMOS transistor MN14 connected in parallel with the series-connected PMOS transistors (e.g., MP13 and MP14). An MTD<1> signal can be input to a gate terminal of the fourteenth NMOS transistor MN14. The MTB<1> signal, the ABENB_VDDI signal, and the MTD<1> signal input to the gate terminal of each transistor will be described later in the description of FIGS. 4 to 7.

Figure 4:
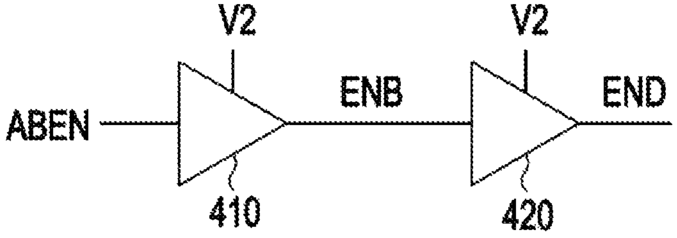
FIG. 4 is an example diagram of generating a control signal to control each element of a low dropout regulator according to an embodiment.

FIG. 4 is an example diagram of generating a control signal to control each element of a low dropout regulator according to an embodiment.

Referring to FIG. 4, the ABEN signal can be input to the first inverter 410, and the first inverter 410 can output the ENB signal as an inverted signal according to the second input voltage V2. The ENB signal can be input to the second inverter 420, and the second inverter 420 can output an END signal as an inverted signal according to the second input voltage V2. The ENB signal generated through the first inverter 410 can be input to the gate terminal of the ninth PMOS transistor MP9 of the first switch TG0 shown in FIG. 3A. The END signal generated through the second inverter 420 can be input to the gate terminal of the twelfth NMOS transistor MN12 of the first switch TG0 shown in FIG. 3A.

Figure 5:
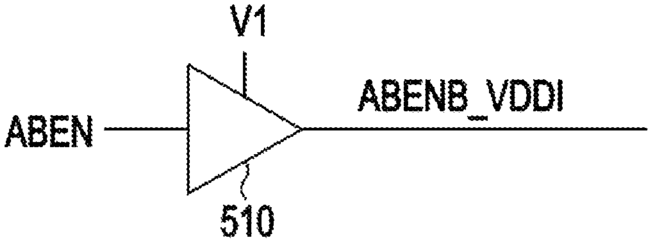
FIG. 5 is another example diagram of generating a control signal for controlling each element of a low dropout regulator according to an embodiment.

FIG. 5 is another example diagram of generating a control signal for controlling each element of a low dropout regulator according to an embodiment.

Referring to FIG. 5, the ABEN signal can be input to the third inverter 530, and the third inverter 510 can output the ABENB_VDDI signal as an inverted signal according to the first input voltage V1. The ABENB_VDDI signal generated through the third inverter 510 can be input to the gate terminals of the tenth PMOS transistor MP10, the twelfth PMOS transistor MP12, and the fourteenth PMOS transistor MP14 of each switching circuit TG0, TG1 and TG2 shown in FIGS. 3A, 3B, and 3C.

Figure 6:
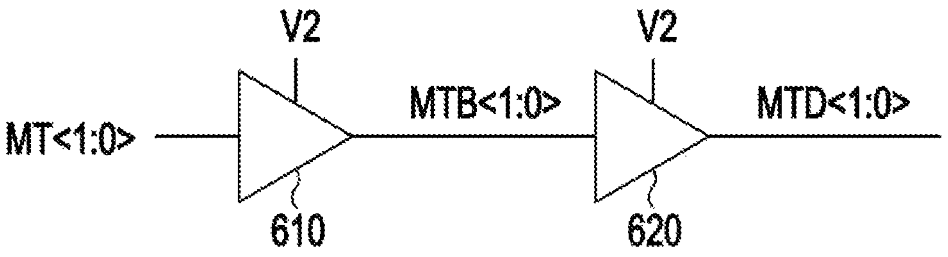
FIG. 6 is another example diagram of generating a control signal for controlling each element of a low dropout regulator according to an embodiment.

FIG. 6 is another example diagram of generating a control signal for controlling each element of a low dropout regulator according to an embodiment.

Referring to FIG. 6, a 2-bit MT<1:0> signal can be input to the fourth inverter 610, and the fourth inverter 610 can output a 2-bit MTB<1:0> signal as an inverted signal according to the second input voltage V2. The MTB<1:0> signal can be input to the fifth inverter 620, and the fifth inverter 620 can output a 2-bit MTD<1:0> signal as an inverted signal according to the second input voltage V2. The MTB<1:0> signal generated through the fourth inverter 610 can be input to the gate terminals of the ninth PMOS transistor MP9, the eleventh PMOS transistor MP11 and the thirteenth PMOS transistor MP13 of each switching circuit TG0, TG1 and TG2 shown in FIGS. 3A, 3B, and 3C. The MTD<1:0> signal generated through the fifth inverter 620 can be input to the gate terminals of the thirteenth NMOS transistor MN13 and the fourteenth NMOS transistor MN14 of each switching circuit TG1 and TG2 shown in FIGS. 3B and 3C.

Figure 7:
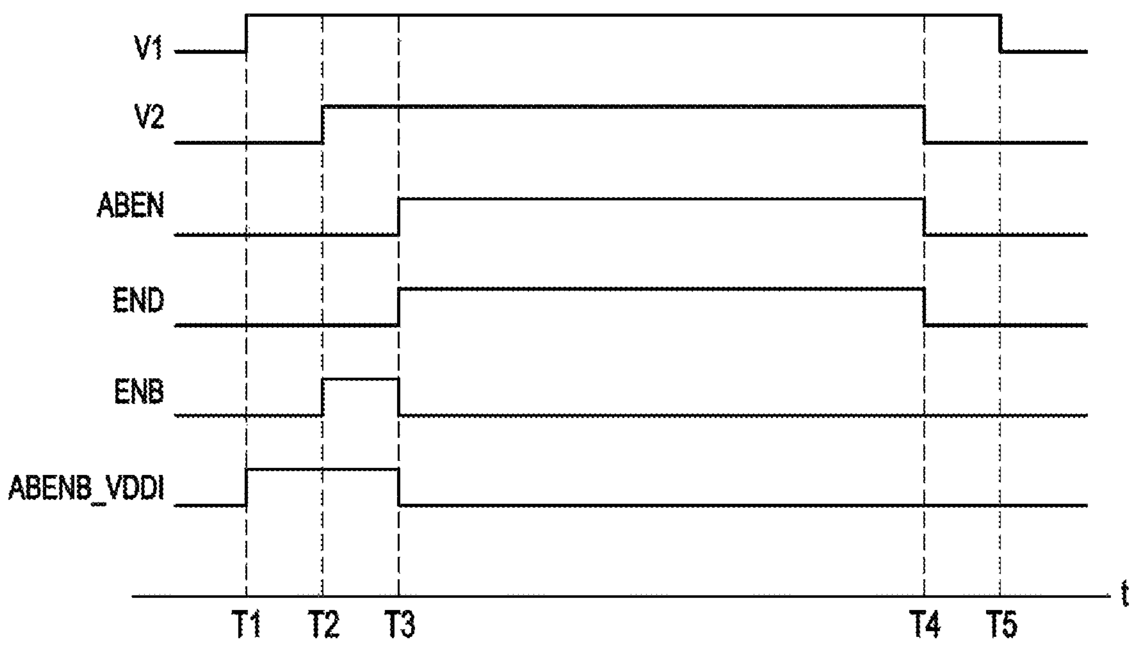
FIG. 7 is a timing diagram of each signal used in a low dropout regulator according to an embodiment.

FIG. 7 is a timing diagram of each signal used in a low dropout regulator according to an embodiment.

Referring to FIG. 7, according to the embodiment, the first input voltage V1 can be converted to a high signal H at time point T1 when the output voltage is supplied through the LDO regulator 200, and can be converted to a low signal L at time point T5 when the supply of output voltage is stopped. As described above, after the first input voltage V1 is converted to a high signal H at time point T1, the second input voltage V2 can be converted to a high signal H at time point T2. The second input voltage V2 can be converted to a low signal L at time point T4, which is before time point T5 when the first input voltage V1 is converted to a low signal L.

According to an embodiment, the ABEN signal is an analog enable signal that can be converted to a high signal at time point T3 and then converted to a low signal at time point T4. As shown in FIG. 4, the ENB signal can be output by inverting the ABEN signal when the second input voltage V2 is a high signal. Accordingly, the ENB signal can be converted to a high signal at time point T2 and then converted to a low signal at time point T3. As shown in FIG. 4, when the second input voltage V2 is a high signal, the second inverter 420 can output the END signal by inverting the ENB signal. Accordingly, the END signal can be converted to a high signal at time point T3 and then converted to a low signal at time point T4. As shown in FIG. 5, when the first input voltage V1 is a high signal, the third inverter 510 can invert the ABEN signal and output the ABENB_VDDI signal. Therefore, the ABEN_VDDI signal can be converted to a high signal at time point T1 and then converted to a low signal at time point T3.

According to an embodiment, referring to FIGS. 2 to 7 described above, in the case of the LDO regulator 200 having a relatively large load, in order to keep the first input voltage V1 supplied to the output circuit 230 relatively low, the input voltage supplied to the error amplifier 210 can be supplied separately. For example, the input voltage supplied to the error amplifier 210 can be the second input voltage V2. The input voltage supplied to the error amplifier 210 can be supplied as a relatively high voltage sufficient to operate the error amplifier 210, and can be supplied as a relatively low voltage to reduce power consumption. For example, when the output voltage VDD is supplied to a display driver IC (DDI), the first input voltage V1, which is a relatively low voltage, can first be supplied from the PMIC to the LDO regulator 200, and afterwards, a second input voltage V2, which is a relatively high voltage, can be supplied to the LDO regulator 200.

Meanwhile, after the first input voltage V1 is supplied, the gate voltage of the PMOS transistors (e.g., MP6, MP7 and MP8) of the driving controllers 251 to 253 can be controlled by the operation of the NMOS transistors (e.g., MN6, MN7 and MN8) of the driving controllers 241, 242 and 243 in order to minimize leakage current in a time section (e.g., a section between T1 and T2) in which the second input voltage V2 is not supplied, According to the embodiment, while the LDO regulator 200 is operating (e.g., in the section between T3 and T4 when the ABEN signal is a high signal), the voltages DRV0, DRV1 and DRV2 input to the gate terminals of the PMOS transistors MP6, MP7 and MP8 of each driver 251 to 253 swing by V2–VDSMP0<DRV0, DRV1, DRV2<VSS+VDSMN5. At this time, unlike shown in FIG. 2, when the driving controllers 241 to 243 are designed with PMOS transistors instead of NMOS transistors (e.g., MN6, MN7 and MN8), and the bulk connection of each PMOS transistor is connected to the first input voltage V1, the voltages DRV0, DRV1 and DRV2 input to the gate terminals of the PMOS transistors MP6, MP7 and MP8 can be greater than the first input voltage V1. Current can leak into the bulk of the PMOS transistor. Therefore, when designing with a PMOS transistor instead of the NMOS transistors MN6, MN7 and MN8 as shown in FIGS. 3A, 3B, and 3C and connecting the bulk connection to a line of the second input voltage V2, current can leak into the bulk because the bulk is 0V in a time section (e.g., a section between T1 and T2) in which the second input voltage V2 is not supplied after the first input voltage V1 is supplied. Accordingly, the transistors of the driving controllers 241 to 243 can be designed as NMOS transistors MN6, MN7 and MN8. Meanwhile, problems with signal transmission can occur due to the threshold voltage of NMOS transistors MN6, MN7 and MN8 in the process of transferring the first input voltage V1 to the voltages DRV0, DRV1 and DRV2 input to the gate terminals of the PMOS transistors MP6, MP7 and MP8 through the NMOS transistors MN6, MN7 and MN8. Accordingly, the ENB signal set according to the second input voltage V2 can be used as the gate voltage of the NMOS transistors MN6, MN7 and MN8. For example, since the second input voltage V2 is used as shown in FIG. 4 to output the ENB signal, a pull-up element, for example, a resistor R2, R3 and R4 can be connected in parallel with NMOS transistors MN6, MN7 and MN8 so that the first input voltage V1 can be supplied to the voltage DRV0, DRV1 and DRV2 input to the gate terminal of the PMOS transistor MP6, MP7 and MP8 in a time section (e.g., a section between T1 and T2) in which the second input voltage V2 is not supplied after the first input voltage V1 is supplied.

According to an embodiment, when the first switch TG0 connects the bulk of the ninth PMOS transistor MP9 to a line of the first input voltage V1 instead of a line of the second input voltage V2, as shown in FIG. 3A, it can leak into the bulk because the voltage of DRV0 swings as V2–VDSMP0<DRV0<VSS+VDSMN5. On the other hand, as shown in FIG. 3A, when the bulk of the ninth PMOS transistor MP9 is connected to the line of the second input voltage V2, current can leak into the bulk because the bulk of the PMOS transistor MP9 is 0V in a time section (e.g., a section between T1 and T2) in which the second input voltage V2 is not supplied after the first input voltage V1 is supplied. In this way, in order to prevent the bulk problem of the PMOS transistor MP9 included in the first switch TG0, the tenth PMOS transistor MP10 connected in parallel with the ninth PMOS transistor MP9 can be additionally disposed in a time section where the circuit is not operating. As the ABENB_VDDI signal is supplied to the gate terminal of the tenth PMOS transistor MP10, the switch TG0 can be controlled to be open until the LDO regulator 200 operates. Accordingly, the DRV terminal of each switch TG0, TG1 and TG2 and the terminals of DRV0, DRV1, and DRV2 can be separated.

According to the embodiment, in the enable section (e.g., the section between T3 and T4 in which the ABEN signal is a high signal) in which the LDO regulator 200 operates, the NMOS transistors MN6, MN7 and MN8 of the driving controllers 241, 242 and 243 can be controlled to be turned off, and each switch TG0, TG1 and TG2 can be controlled to be turned on according to the control of the MT<1:0> signal such that the DRV terminal of each switch TG0, TG1 and TG2 and the terminals of DRV0, DRV1, and DRV2 can be connected to each other. The seventh PMOS transistor MP7 and the eighth PMOS transistor MP8 can be controlled on/off according to the MT<1:0> signal such that the drivers 252 and 253 of the LDO regulator 200 can be driven.

According to an embodiment, referring again to FIG. 2, as described above, to prevent leakage current in a time section (e.g., a section between T1 and T2) in which the second input voltage V2 is not supplied after the first input voltage V1 is supplied, pull-up elements R2, R3 and R4 can be additionally connected in parallel to the NMOS transistors MN6, MN7 and MN8 of the driving controllers 241, 242 and 243. Meanwhile, in the section where the LDO regulator 200 is operating (e.g., the section between T3 and T4), unnecessary current can leak through the switching circuits TG0, TG1 and TG2 and the fifth NMOS transistor MN5. Additionally, in a section where the LDO regulator 200 is operating (e.g., a section between T3 and T4), current leakage through the pull-up elements R2, R3 and R4 can be inversely proportional to the magnitude of the resistance. Accordingly, as the magnitudes of the pull-up elements R2, R3 and R4 is designed to be large, the magnitude of the LDO regulator 200 can be increased. In addition, in a time section (e.g., a section between T1 and T2) in which the second input voltage V2 is not supplied after the first input voltage V1 is supplied, the voltage within the switching circuits TG0, TG1 and TG2, a problem of voltage instability can occur because the voltage within the switching circuits TG0, TG1 and TG2 is floating. To solve this problem, according to an embodiment, the driving controllers 241 to 243 can be implemented with PMOS transistors instead of NMOS transistors, as shown in FIG. 8, which will be described later.

Figure 8:
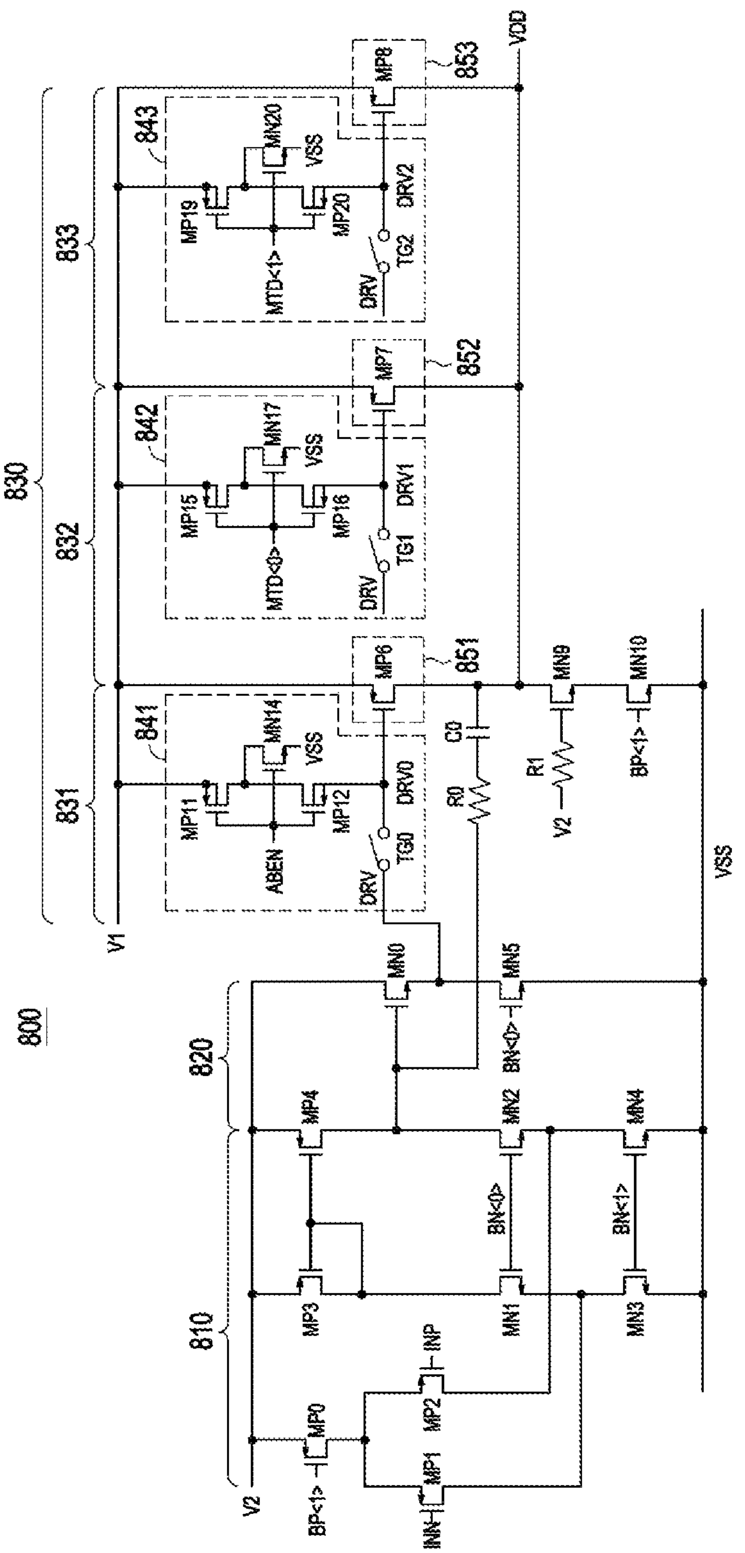
FIG. 8 is another example circuit diagram of a low dropout regulator according to an embodiment.

FIG. 8 is another example circuit diagram of a low dropout regulator according to an embodiment.

Referring to FIG. 8, the LDO regulator 800 can comprise an error amplifier 810, a buffer 820 (e.g., a source follower buffer), and an output circuit 830.

According to the embodiment, the output circuit 830 can comprise a first output circuit 831, a second output circuit 832, and a third output circuit 833. According to various embodiments, the output circuit 830 can be comprised of only the first output circuit 831, or can be comprised of two or more output circuits (e.g., three) as shown in FIG. 8. When configured to include three output circuits as shown in FIG. 8, at least one output circuit can selectively operate according to a control signal. For example, only the first output circuit 831 can be operated, the first output circuit 831 and the second output circuit 832 can be operated together, or the first output circuit 831, the second output circuit 832, and the third output circuit 833 can be operated together.

According to an embodiment, each of the output circuits (e.g., the first output circuit 831, the second output circuit 832, and the third output circuit 833) can comprise a driving controller and a driver. For example, the first output circuit 831 can comprise a first driving controller 841 and a first driver 851. The second output circuit 832 can comprise a second driving controller 842 and a second driver 852. The third output circuit 833 can comprise a third driving controller 843 and a third driver 853. In the embodiments described later, descriptions that overlap with those of FIG. 2 will be omitted.

According to an embodiment, each of the drivers 851 to 853 can comprise PMOS transistors MP6, MP7 and MP8 as driving transistors. Each of the driving controllers 841, 842, and 843 can be connected to the gate terminal of the PMOS transistor MP6, MP7 and MP8 included in the corresponding driver 851 to 853 to control the output voltage. For example, the first driving controller 841 can adjust the output voltage of the first driver 851 by controlling the voltage input to the gate terminal of the sixth PMOS transistor MP6 included in the first driver 851. The second driving controller 842 can adjust the output voltage of the second driver 852 by controlling the voltage input to the gate terminal of the seventh PMOS transistor MP7 included in the second driver 852. The third driving controller 843 can adjust the output voltage of the third driver 853 by controlling the voltage input to the gate terminal of the eighth PMOS transistor MP8 included in the third driver 853.

According to an embodiment, each of the driving controllers 841, 842, and 843 can comprise a switching circuit, an NMOS transistor, and a PMOS transistor. The switching circuits TG0, TG1, and TG2 can be connected between a node of the error amplifier 810 or buffer 820 and the gate terminal of the PMOS transistor included in the driver. By controlling the switching circuit to be short-circuited or open, the output of the error amplifier 810 or buffer 820 can be controlled to be input to or blocked from the gate terminal of the PMOS transistor. Examples of the switching circuits TG0, TG1 and TG2 will be described later in the description of FIGS. 9A, 9B, and 9C.

According to an embodiment, the first driving controller 841 can comprise a first switch TG0, an eleventh PMOS transistor MP11, a twelfth PMOS transistor MP12, and a fourteenth NMOS transistor MN14. As shown in FIG. 8, the first switch TG0 can comprise one terminal connected between the zeroth NMOS transistor MN0 and the fifth NMOS transistor MN5 included in the buffer 820, and the other terminal connected to the gate terminal of the sixth PMOS transistor MP6 included in the first driver 851. The eleventh PMOS transistor MP11 can comprise one terminal (e.g., source terminal) connected to a supply line that supplies the first input voltage V1, and the other terminal (e.g., gate terminal) connected to one terminal e.g., gate terminal) of the twelfth PMOS transistor MP12. The twelfth PMOS transistor MP12 can comprise one terminal (e.g., a gate terminal) connected to the other terminal (e.g., a gate terminal) of the eleventh PMOS transistor MP11, and the other terminal (e.g., source terminal) connected between the first switch TG0 and the gate terminal of the sixth PMOS transistor MP6. The fourteenth NMOS transistor MN14 can comprise one terminal (e.g., gate terminal) connected to the other terminal (e.g., gate terminal) of the eleventh PMOS transistor MP11, and the other terminal (e.g., source terminal) connected to the line of the base voltage VSS. An ABEN signal can be input to the gate terminals of the eleventh PMOS transistor MP11, the twelfth PMOS transistor MP12, and the fourteenth NMOS transistor MN14.

According to an embodiment, the second driving controller 842 can comprise a second switch TG1, a fifth PMOS transistor MP15, a sixteenth PMOS transistor MP16, and a seventeenth NMOS transistor MN17. As shown in FIG. 8, the second switch TG1 can comprise one terminal connected between the zeroth NMOS transistor MN0 and the fifth NMOS transistor MN5 included in the buffer 820, and the other terminal connected to the gate terminal of the seventh PMOS transistor MP7 included in the second driver 852. The fifth PMOS transistor MP15 can comprise one terminal (e.g., source terminal) connected to a supply line that supplies the first input voltage V1, and the other terminal (e.g., gate terminal) connected to one terminal (e.g., gate terminal) of the sixteenth PMOS transistor MP16. The sixteenth PMOS transistor MP16 can comprise one terminal (e.g., gate terminal) connected to the other terminal (e.g., gate terminal) of the fifth PMOS transistor MP15, and the other terminal (e.g., source terminal) connected between the second switch TG1 and the gate terminal of the seventh PMOS transistor MP7. The seventeenth NMOS transistor MN17 can comprise one terminal (e.g., gate terminal) connected to the other terminal (e.g., gate terminal) of the fifth PMOS transistor MP15, and the other terminal (e.g., source terminal) connected to the line of the base voltage VSS. An MTD<0> signal can be input to the gate terminals of the fifth PMOS transistor MP15, sixteenth PMOS transistor MP16, and seventeenth NMOS transistor MN17.

According to an embodiment, the third driving controller 843 can comprise a third switch TG2, a nineteenth PMOS transistor MP19, a twentieth PMOS transistor MP20, and a twentieth NMOS transistor MN20. As shown in FIG. 8, the third switch TG2 can comprise one terminal connected between the zeroth NMOS transistor MN0 and the fifth NMOS transistor MN5 included in the buffer 820, and the other terminal connected to the gate terminal of the eighth PMOS transistor MP8 included in the third driver 853. The nineteenth PMOS transistor MP19 can comprise one terminal (e.g., source terminal) connected to a supply line that supplies the first input voltage V1, and the other terminal (e.g., gate terminal) connected to one terminal (e.g., gate terminal) of the twentieth PMOS transistor MP20. The twentieth PMOS transistor MP20 can comprise one terminal (e.g., a gate terminal) connected to the other terminal (e.g., a gate terminal) of the nineteenth PMOS transistor MP19, and the other terminal (e.g., source terminal) connected between the third switch TG2 and the gate terminal of the eighth PMOS transistor MP8. The twentieth NMOS transistor MN20 can comprise one terminal (e.g., gate terminal) connected to the other terminal (e.g., gate terminal) of the nineteenth PMOS transistor MP19, and the other terminal (e.g., source terminal) connected to the line of the base voltage VSS. An MTD<1> signal can be input to the gate terminals of the nineteenth PMOS transistor MP19, the twentieth PMOS transistor MP20, and the twentieth NMOS transistor MN20.

According to an embodiment, the sixth PMOS transistor MP6 included in the first driver 851 can comprise a source terminal connected to a supply line that supplies the first input voltage V1 and a drain terminal connected to the output line that outputs the output voltage VDD to the load. The seventh PMOS transistor MP7 included in the second driver 852 can comprise a source terminal connected to a supply line that supplies the first input voltage V1 and a drain terminal connected to an output line that outputs the output voltage VDD to a load. The eighth PMOS transistor MP8 included in the third driver 853 can comprise a source terminal connected to a supply line that supplies the first input voltage V1 and a drain terminal connected to an output line that outputs the output voltage VDD to a load.

According to an embodiment, the LDO regulator 800 can generate the output voltage VDD by reducing the first input voltage V1 input to each driver 851 to 853 of the output circuit 830. The first input voltage V1 input to each of the drivers 851 to 853 can be supply power or a supply voltage supplied from outside the LDO regulator 800. For example, the first input voltage V1 can be supplied from a PMIC, but is not limited thereto.

According to an embodiment, the LDO regulator 800 can feed back the output voltage divided by an output voltage divider (not shown) to the error amplifier 810 to adjust the magnitude of the load current flowing to the load to which the output voltage VDD is supplied. The output voltage fed back to the error amplifier 810 can be referred to as a feedback voltage VFB.

According to an embodiment, the error amplifier 810 can receive the feedback voltage VFB and the reference voltage Vref and output a result amplified by the difference to the buffer 820 or the output circuit 830. The output voltage of the error amplifier 810 can be input to the gate terminal of the PMOS transistors MP6, MP7 and MP8 included in each driver 851 to 853 through each switch TG0, TG1 and TG2. The gate voltage of each PMOS transistor MP6, MP7 and MP8 can be adjusted according to the output voltage of the error amplifier 810, so that the output voltage VDD can be adjusted to be constant.

According to an embodiment, the error amplifier 810 can use a second input voltage V2 as a driving power source or driving voltage. The second input voltage V2 can be an input voltage of a different magnitude from a first input voltage V1 which is an input voltage of the output circuit 830. The second input voltage V2 input to the error amplifier 810 can be a supply power or a supply voltage supplied from outside the LDO regulator 200. For example, the second input voltage V2 can be supplied from a power management integrated circuit (PMIC), but is not limited thereto. According to an embodiment, the magnitude of the first input voltage V1 can be smaller than the magnitude of the second input voltage V2. For example, the input voltage (e.g., the first input voltage V1) and the input voltage (e.g., the second input voltage V2) can be supplied differently, so a relatively low input voltage (e.g., first input voltage V1) can be used in the LOD regulator 800 with a relatively large load. The first input voltage V1 can be supplied from the LDO regulator 800 to each driver 851 to 853 (e.g., PMOS transistors MP6, MP7, and MP8) of the output circuit 830, and the second input voltage V2 can be supplied to the error amplifier 810. For example, the input voltage (e.g., the second input voltage V2) supplied to the error amplifier 810 can be supplied at a relatively high voltage to enable the plurality of MOS transistors included in the error amplifier 810 to operate. The input voltage (e.g., first input voltage V1) supplied to the output circuit 830 can be relatively lower than the second input voltage V2 supplied to the error amplifier 810, so that power can be saved in the LDO regulator 800, which has a relatively large load. The error amplifier 810 can be configured in a cascode form as shown in FIG. 8, but is not limited thereto. Since the configuration and operation of the error amplifier 810 and buffer 820 are the same or similar to those in FIG. 2, detailed description will be omitted.

According to an embodiment, in the error amplifier 810, a differentially amplified voltage (e.g., amplifier output voltage or error voltage) with respect to the feedback voltage VFB supplied to the gate terminal of the first PMOS transistor MP1 and the reference voltage Vref supplied to the gate terminal of the second PMOS transistor MP2 can be supplied to the gate terminal of the PMOS transistor MP6, MP7 and MP8 included in each driver 851 to 853 through the buffer 820, and an output voltage VDD can be generated according to the operation of each PMOS transistor MP6, MP7 and MP8.

Hereinafter, with reference to FIGS. 9A, 9B, and 9C, the structure of the switching circuit connected to the gate terminal of each driving transistor (e.g., PMOS transistors MP6, MP7 and MP8 included in the drivers 851 to 853) will be explained.

Figure 9A:
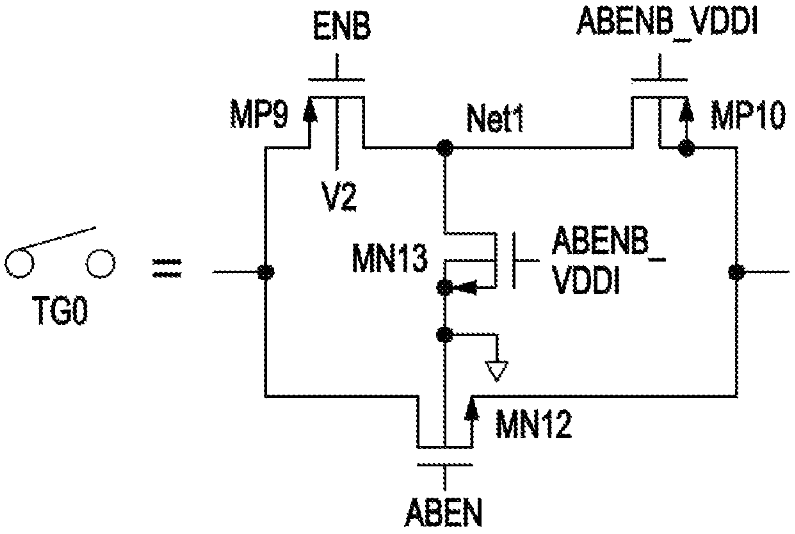
FIG. 9A is an example of a circuit diagram of a switching circuit connected to a gate terminal of a driving transistor according to an embodiment.

FIG. 9A is an example of a circuit diagram of a switching circuit connected to a gate terminal of a driving transistor according to an embodiment.

Referring to FIG. 9A, in the first switch TG0, a ninth PMOS transistor MP9 and a tenth PMOS transistor MP10 can be connected in series. An ENB signal can be input to the gate terminal of the ninth PMOS transistor MP9, and a second input voltage V2 can be input to the bulk. The ABENB_VDDI signal can be input to the gate terminal of the tenth PMOS transistor MP10. According to an embodiment, the first switch TG0 can further comprise a twelfth NMOS transistor MN12 connected in parallel with the series-connected PMOS transistors (e.g., MP9 and MP10). An ABEN signal can be input to the gate terminal of the twelfth NMOS transistor MN12. According to an embodiment, the first switch TG0 can further comprise a thirteenth NMOS transistor MN13. The thirteenth NMOS transistor MN13 can comprise one terminal (e.g., drain terminal) connected between the ninth PMOS transistor MP9 and the tenth PMOS transistor MP10 and the other terminal (e.g., source terminal) connected to the bulk of the twelfth NMOS transistor MN12. The ABENB_VDDI signal can be input to the gate terminal of the thirteenth NMOS transistor MN13. The ENB signal, the ABENB_VDDI signal, and the ABEN signal input to the gate terminal of each transistor can be generated by the same or similar method as the method described above in FIGS. 4 to 7.

Figure 9B:
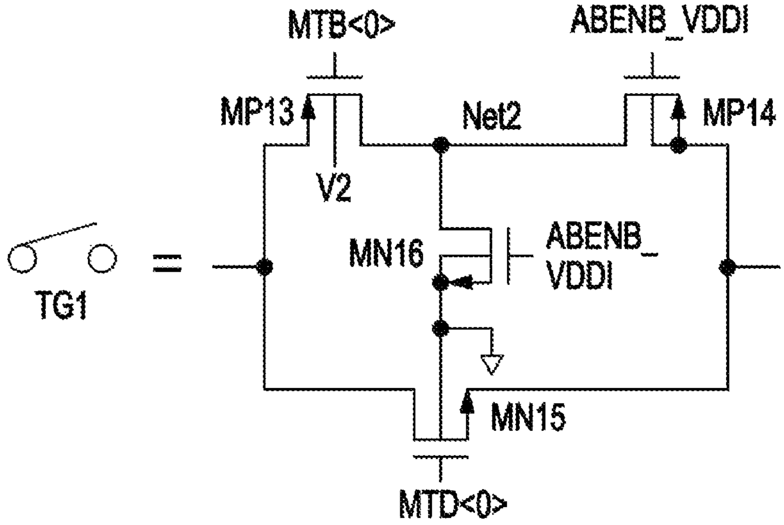
FIG. 9B is another example of a circuit diagram of a switching circuit connected to a gate terminal of a driving transistor according to an embodiment.

FIG. 9B is another example of a circuit diagram of a switching circuit connected to a gate terminal of a driving transistor according to an embodiment.

Referring to FIG. 9B, the thirteenth PMOS transistor MP13 and the fourteenth PMOS transistor MP14 can be connected in series in the second switch TG1. A MTB<0> signal can be input to the gate terminal of the thirteenth PMOS transistor MP13, and a second input voltage V2 can be input to the bulk. The ABENB_VDDI signal can be input to the gate terminal of the fourteenth PMOS transistor MP14. According to an embodiment, the second switch TG1 can further comprise a fifteenth NMOS transistor MN15 connected in parallel with the series-connected PMOS transistors (e.g., MP13 and MP14). An MTD<0> signal can be input to the gate terminal of the fifteenth NMOS transistor MN15. According to an embodiment, the second switch TG1 can further comprise a sixteenth NMOS transistor MN16. The sixteenth NMOS transistor MN16 can comprise one terminal (e.g., drain terminal) connected between the thirteenth PMOS transistor MP13 and the fourteenth PMOS transistor MP14 and the other terminal (e.g., source terminal) connected to the bulk of the fifth NMOS transistor MN15. The ABENB_VDDI signal can be input to the gate terminal of the sixteenth NMOS transistor MN16. The MTB<0> signal, the ABENB_VDDI signal, and the MTD<0> signal input to the gate terminal of each transistor can be generated by the same or similar method as the method described above in FIGS. 4 to 7.

Figure 9C:
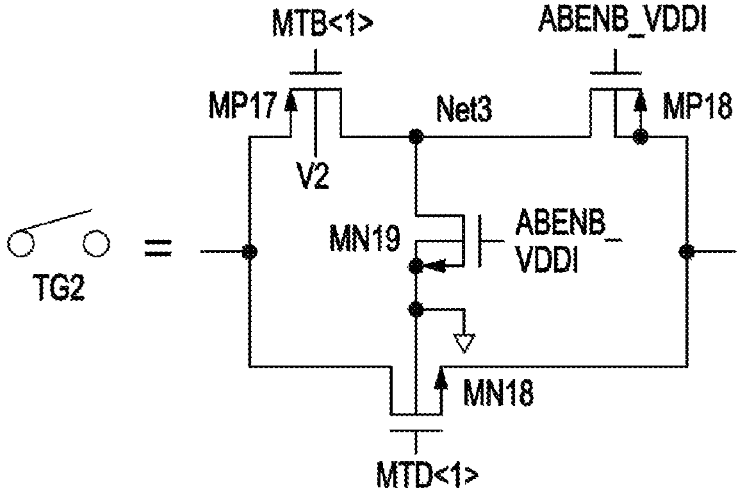
FIG. 9C is another example of a circuit diagram of a switching circuit connected to a gate terminal of a driving transistor according to an embodiment.

FIG. 9C is another example of a circuit diagram of a switching circuit connected to a gate terminal of a driving transistor according to an embodiment.

Referring to FIG. 9C, the seventeenth PMOS transistor MP17 and the eighteenth PMOS transistor MP18 can be connected in series in the third switch TG2. An MTB<1> signal can be input to the gate terminal of the seventeenth PMOS transistor MP17, and a second input voltage V2 can be input to the bulk. The ABENB_VDDI signal can be input to the gate terminal of the eighteenth PMOS transistor MP18. According to an embodiment, the third switch TG2 can further comprise an eighteenth NMOS transistor MN18 connected in parallel with the series-connected PMOS transistors (e.g., MP17 and MP18). An MTD<1> signal can be input to the gate terminal of the eighteenth NMOS transistor MN18. According to an embodiment, the third switch TG2 can further comprise a nineteenth NMOS transistor MN19. The nineteenth NMOS transistor MN19 can comprise one terminal (e.g., drain terminal) connected between the seventeenth PMOS transistor MP17 and the eighteenth PMOS transistor MP18 and the other terminal (e.g., source terminal) connected to the bulk of the eighteenth NMOS transistor MN18. The ABENB_VDDI signal can be input to the gate terminal of the nineteenth NMOS transistor MN19. The MTB<1> signal, the ABENB_VDDI signal, and the MTD<1> signal input to the gate terminal of each transistor can be generated by the same or similar method as the method described above with reference to FIGS. 4 to 7.

According to an embodiment, referring to the above-described FIGS. 8 and 9, the MOS transistors included in the driving controllers 841, 842, and 843, unlike FIG. 2, can be disposed as PMOS transistors (e.g., MP11, MP12, MP15, MP16, MP19 and MP20) and the gate terminal of the PMOS transistor can be controlled by the ABEN signal, so that as the PMOS transistors can be turned on in the section where the LDO regulator is not operating, the voltages DRV0, DRV1 and DRV2 input to the gate terminals of the PMOS transistors MP6, MP7 and MP8 are set to the first input voltage V 1. For example, even in a time section (e.g., a section between T1 and T2) in which the second input voltage V2 is not supplied after the first input voltage V1 is supplied, the voltage supplied to the gate terminal of the PMOS transistors MP6, MP7 and MP8, which are driving transistors included in the drivers 851 to 853, can be set as the first input voltage V1 by using the PMOS transistors (e.g., MP11, MP12, MP15, MP16, MP19 and MP20) such that current leakage can be suppressed.

According to the embodiment, in the section in which the LDO regulator 800 operates (e.g., the section between T3 and T4 in which the ABEN signal is a high signal), the voltage supplied to the gate terminal of the PMOS transistors MP6, MP7 and MP8, which are driving transistors, can be related to the signal of MT<1:0> and can be connected to the DRV terminal of the switching circuit TG0, TG1 and TG2. To this end, PMOS transistors (e.g., MP11, MP12, MP15, MP16, MP19 MP20) included in the driving controllers 841, 842, and 843 can be turned off. Meanwhile, the bulk of the PMOS transistors MP11, MP15, and MP19 can be related to the MT<1:0> signal by connecting to the first input voltage V1 as shown in FIG. 8. Accordingly, when the LDO regulator 800 is not operating, because the voltage between the two PMOS transistors (MP11, MP12, MP15, MP16, MP19 and MP20) included in each driving controller 841 to 843 can be at the same voltage level as the first input voltage V1, current may not leak. In addition, when the LDO regulator 800 operates, the voltage between the two PMOS transistors (MP11, MP12, MP15, MP16, MP19 and MP20) included in each of the driving controllers 841 to 843 can become 0V by the NMOS transistors MN14, MN17 and MN20, so current leakage through the bulk does not occur.

According to an embodiment, the bulk of the PMOS transistors MP12, MP16 and MP20 can be connected to the terminals of DRV0, DRV1, and DRV2 of the switching circuits TG0, TG1 and TG2, respectively, and thus can be related to the MT<1:0> signal. When the LDO regulator 800 is not operating, the voltage between the two PMOS transistors (MP11, MP12, MP15, MP16, MP19 and MP20) included in each of the driving controllers 841 to 843 and the voltage input to the gate terminal of the PMOS transistors MP6, MP7 and MP8 can be at the same voltage level as the first input voltage V1, current does not leak. Additionally, according to the embodiment, when the LDO regulator 800 operates, the voltage between the two PMOS transistors included in each of the driving controllers 841, 842, and 843 can become 0V by the NMOS transistors MN14, MN17 and MN20, and the voltage of each bulk can be the same as the voltage DRV0, DRV1 and DRV2 input to the gate terminal of the PMOS transistor MP6, MP7 and MP8, no current leakage through the bulk occurs.

According to the embodiment, in the section in which the LDO regulator 800 is not operating, as the tenth PMOS transistor MP10 is added to separate the DRV terminal of the switching circuit TG0, TG1 and TG2 and the terminals of each DRV0, DRV1, and DRV2, the ninth PMOS transistor MP9 and the tenth PMOS transistor MP10 included in the first switch TG0 can be in a floating state. According to an embodiment, the thirteenth NMOS transistor MN13 can be added to suppress the floating state, and the thirteenth NMOS transistor MN13 can be controlled to turn on in a section in which the LDO regulator 800 is not operating. Accordingly, in the section in which the LDO regulator 800 is not operating, the voltage between the ninth PMOS transistor MP9 and the tenth PMOS transistor MP10 included in the first switch TG0 can be set to 0V to maintain stable operation of the first switch TG0.

As described above, according to the embodiment, the input voltage supplied from the LDO regulator to the driving transistor and the input voltage supplied to the error amplifier can be supplied differently, so that a relatively low input voltage can be used in the LOD regulator with a relatively large load.

In addition, the input voltage supplied from the LDO regulator to the driving transistor and the input voltage supplied to the error amplifier can be supplied differently, but a PMOS transistor between the input line and gate terminal of the driving transistor can be connected, so that unnecessary current due to the use of the pull-up element can be reduced. In addition, since a pull-up element is not used, the area required for using a resistor can be reduced. Additionally, when the LDO regulator is not operating, stability of operation can be ensured by setting the voltage in the switch connected to the driving transistor to 0V.

What is claimed is:

1. A low dropout regulator, comprising:

a driver configured to receive a first input voltage and generate an output voltage;

an error amplifier configured to receive a second input voltage having a magnitude different from the first input voltage and output an amplifier output voltage based on a difference between a feedback voltage corresponding to the output voltage and a reference voltage; and a driving controller configured to control the output voltage of the driver based on the amplifier output voltage, wherein the driver comprises a driving transistor, wherein a signal corresponding to the amplifier output voltage is configured to be input to a gate terminal of the driving transistor, and wherein the driving controller comprises:

a switching circuit connected between an output line of the error amplifier and the gate terminal of the driving transistor;

a first PMOS transistor comprising one terminal connected to a supply line that is configured to supply the first input voltage; and a second PMOS transistor comprising one terminal connected to another terminal of the first PMOS transistor and another terminal connected between the switching circuit and the gate terminal of the driving transistor.

2. The low dropout regulator of claim 1, wherein the first input voltage and the second input voltage are configured to be transmitted from a power management integrated circuit, respectively.

3. The low dropout regulator of claim 1, wherein the magnitude of the second input voltage is greater than a magnitude of the first input voltage.

4. The low dropout regulator of claim 1, wherein the second input voltage is configured to be supplied to the error amplifier after the first input voltage is supplied to the driver.

5. The low dropout regulator of claim 1, wherein the driving controller comprises:

an NMOS transistor comprising one terminal connected to the supply line that is configured to supply the first input voltage and another terminal connected between the switching circuit and the gate terminal of the driving transistor.

6. The low dropout regulator of claim 5, wherein the driving controller comprises:

a pull-up element connected in parallel with the NMOS transistor.

7. The low dropout regulator of claim 5, wherein the switching circuit is configured to be controlled to be open after the first input voltage is supplied to the driver and before the second input voltage is supplied to the error amplifier.

8. The low dropout regulator of claim 1, wherein the driving controller comprises:

an NMOS transistor comprising one terminal connected between the first PMOS transistor and the second PMOS transistor, and another terminal connected to ground.

9. A low dropout regulator, comprising:

a driver configured to receive a first input voltage and generate an output voltage;

an error amplifier configured to receive a second input voltage having a magnitude different from the first input voltage and output an amplifier output voltage based on a difference between a feedback voltage corresponding to the output voltage and a reference voltage; and a driving controller configured to control the output voltage of the driver based on the amplifier output voltage, wherein the driving controller comprises:

a switching circuit connected between an output line of the error amplifier and a gate terminal of a driving transistor;

a first PMOS transistor comprising one terminal connected to a supply line that is configured to supply the first input voltage; and a second PMOS transistor comprising one terminal connected to another terminal of the first PMOS transistor and another terminal connected between the switching circuit and the gate terminal of the driving transistor.

10. The low dropout regulator of claim 9, wherein the first input voltage and the second input voltage are configured to be transmitted from a power management integrated circuit, respectively.

11. The low dropout regulator of claim 9, wherein the magnitude of the second input voltage is greater than a magnitude of the first input voltage.

12. The low dropout regulator of claim 9, wherein the second input voltage is configured to be supplied to the error amplifier after the first input voltage is supplied to the driver.

13. The low dropout regulator of claim 9, wherein the driver comprises the driving transistor, and wherein a signal corresponding to the amplifier output voltage is configured to be input to a gate terminal of the driving transistor.

14. The low dropout regulator of claim 9, wherein the switching circuit is configured to be controlled to be open after the first input voltage is supplied to the driver and before the second input voltage is supplied to the error amplifier.

15. The low dropout regulator of claim 9, wherein the driving controller comprises:

an NMOS transistor comprising one terminal connected between the first PMOS transistor and the second PMOS transistor and another terminal connected to ground.

16. A low dropout regulator, comprising:

a driver configured to receive a first input voltage and generate an output voltage;

an error amplifier configured to receive a second input voltage having a magnitude different from the first input voltage and output an amplifier output voltage based on a difference between a feedback voltage corresponding to the output voltage and a reference voltage;

a first PMOS transistor comprising one terminal connected to a supply line that is configured to supply the first input voltage; and a second PMOS transistor comprising one terminal connected to another terminal of the first PMOS transistor and another terminal connected to a gate terminal of a driving transistor included in the driver.

17. The low dropout regulator of claim 16, wherein the second input voltage is configured to be supplied to the error amplifier after the first input voltage is supplied to the driver.

* * * * *